(12) United States Patent
Shang et al.

(10) Patent No.: US 12,100,957 B1
(45) Date of Patent: Sep. 24, 2024

(54) VECTOR STABILIZER FOR POWER ELECTRONIC POWER SYSTEM

(71) Applicant: Wuhan University, Hubei (CN)

(72) Inventors: Lei Shang, Hubei (CN); Xuzhu Dong, Hubei (CN); Zhuhu Hua, Hubei (CN)

(73) Assignee: Wuhan University, Hubei (CN)

( * ) Notice: Subject to any disclaimer, the term of this patent is extended or adjusted under 35 U.S.C. 154(b) by 0 days.

(21) Appl. No.: 18/633,535

(22) Filed: Apr. 12, 2024

(30) Foreign Application Priority Data

Nov. 6, 2023 (CN) .......................... 202311460969.2

(51) Int. Cl.
   *H02J 3/24* (2006.01)
(52) U.S. Cl.
   CPC ...................................... *H02J 3/24* (2013.01)
(58) Field of Classification Search
   CPC ......................................................... H02J 3/24
   See application file for complete search history.

(56) References Cited

U.S. PATENT DOCUMENTS

| | | | | |
|---|---|---|---|---|
| 7,002,989 | B2* | 2/2006 | Agrawal | H04L 69/08 370/467 |
| 9,774,285 | B2* | 9/2017 | Huang | H02P 6/182 |
| 10,103,664 | B2* | 10/2018 | Yamakawa | H02P 9/04 |
| 11,415,948 | B2* | 8/2022 | Fujiwara | F16F 15/18 |
| 11,563,367 | B2* | 1/2023 | Ogawa | H02M 7/53873 |
| 2012/0276905 | A1* | 11/2012 | Shang | H04W 92/04 455/436 |
| 2015/0333681 | A1* | 11/2015 | Matsuki | H02P 21/0085 318/400.02 |
| 2016/0028339 | A1* | 1/2016 | Nakai | H02P 21/50 318/400.02 |
| 2020/0303943 | A1* | 9/2020 | Jin | H02J 3/381 |
| 2021/0075311 | A1* | 3/2021 | Jin | H02J 3/01 |
| 2024/0142926 | A1* | 5/2024 | Hissel | H02J 3/381 |
| 2024/0146221 | A1* | 5/2024 | Hissel | H02P 9/105 |

* cited by examiner

*Primary Examiner* — Ramesh B Patel
(74) *Attorney, Agent, or Firm* — JCIPRNET

(57) ABSTRACT

Disclosed are a vector synchronization method and system, the method includes: converting a three-phase instantaneous value of a power grid voltage into a two-phase voltage vector component through employing a power grid voltage vector phase angle at a previous moment; subtracting the d-axis voltage vector component from the power grid vector amplitude to obtain a d-axis voltage component deviation; performing gain and integral operations on the d-axis voltage component deviation to obtain a power grid vector amplitude; performing gain, integral and proportional-integral operations on the q-axis voltage component deviation to obtain a power grid voltage vector phase angle; respectively converting the d-axis voltage component deviation and the q-axis voltage component deviation into a q-axis current compensation signal and a d-axis current compensation signal of the grid-connected inverter; and the small interference stability of the grid-connected inverter is enhanced by adopting d-axis and q-axis current compensation signals of the grid-connected inverter.

8 Claims, 2 Drawing Sheets

VECTOR STABILIZER FOR POWER ELECTRONIC POWER SYSTEM

CROSS-REFERENCE TO RELATED APPLICATION

This application claims the priority benefit of China application serial no. 202311460969.2, filed on Nov. 6, 2023. The entirety of the above-mentioned patent application is hereby incorporated by reference herein and made a part of this specification.

BACKGROUND

Technical Field

The disclosure belongs to the technical field of small interference stability enhancement control of new energy power systems, and more specifically, relates to a vector synchronization method and system for improving the small interference stability of a grid-connected inverter.

Description of Related Art

The widespread access to power electronic equipment such as electrochemical energy storage, photovoltaics and wind turbines has worsen the problems of small interference and instability such as harmonic resonance and power oscillation of power grids at all levels, and the problems seriously hinder the safe and stable operation of the power system and restricting the development of new energy sources. At current stage, measures to enhance the small interference stability of power electronic power systems include adding synchronous condensers, grid-connected inverter control strategy network transformation, and power system stabilizer solutions. However, existing methods often require the investment of expensive additional equipment, or require substantial modifications to mature commercial inverters, or they are only adapted to small interference instability suppression at a certain frequency under a certain control strategy.

SUMMARY

In view of the shortcomings of the existing technology, the purpose of the present disclosure is to provide a vector synchronization method and system for improving the small interference stability of a grid-connected inverter, aiming to solve the following existing problems for enhancing power electronic power system, namely, the requirement to make substantial modifications to mature commercial inverters, and the ability of being only adapted to small interference instability suppression at a certain frequency under a certain control strategy.

In order to achieve the above purpose, in the first aspect, the present disclosure provides a vector synchronization method for improving the small interference stability of a grid-connected inverter, which includes the following steps:

converting a three-phase instantaneous value of a power grid voltage into a d-axis voltage vector component and a q-axis voltage vector component through employing a power grid voltage vector phase angle at a previous moment; wherein the q-axis voltage vector component serves as the q-axis voltage component deviation;

subtracting the d-axis voltage vector component from the power grid vector amplitude at a previous moment to obtain a d-axis voltage component deviation;

performing gain and integral operations on the d-axis voltage component deviation in sequence to obtain a power grid vector amplitude at a current moment; wherein the power grid vector amplitude at the current moment is used to calculate the d-axis voltage component deviation at the next moment;

performing gain, integral and proportional-integral operation on the q-axis voltage component deviation in sequence to obtain a power grid voltage vector phase angle at the current moment; wherein the power grid voltage vector phase angle at the current moment is used for converting the coordinate of the three-phase instantaneous value of a power grid voltage at the next moment;

converting the d-axis voltage component deviation and the q-axis voltage component deviation into a q-axis current compensation signal and a d-axis current compensation signal of the grid-connected inverter;

enhancing the small-interference stability of the grid-connected inverter by adopting the d-axis current compensation signal of the grid-connected inverter and the q-axis current compensation signal of the grid-connected inverter to respectively compensate the d-axis current and q-axis current actually output by the grid-connected inverter.

More preferably, the expressions of d-axis voltage component deviation and the q-axis voltage component deviation are:

$$\begin{cases} U_{tq\_err}^{VSS} = U_{tq}^{VSS} \\ U_{td\_err}^{VSS} = U_{td}^{VSS} - U_{VSS} \end{cases}$$

In the expression, $U_{td\_err}^{VSS}$ is the d-axis voltage component deviation; $U_{tq\_err}^{VSS}$ is the q-axis voltage component deviation; $U_{td}^{VSS}$ is the d-axis voltage vector component; $U_{tq}^{VSS}$ is the q-axis voltage vector component; $U_{VSS}$ is the power grid vector amplitude at the previous moment.

More preferably, the q-axis current compensation signal of the grid-connected inverter and the d-axis current compensation signal of the grid-connected inverter are expressed as follows:

$$\begin{cases} I_{td}^{add} = U_{tq}^{VSS} \dfrac{k_{qVSS}}{T_{qVSS}s+1} = U_{tq\_err}^{VSS} K_{qVSS}(s) \\ I_{tq}^{add} = (U_{td}^{VSS} - U_{VSS}) \dfrac{k_{dVSS}}{T_{dVSS}s+1} = U_{td\_err}^{VSS} K_{dVSS}(s) \end{cases}$$

In the expression, $I_{tq}^{add}$ is the q-axis current compensation signal of the grid-connected inverter; $I_{td}^{add}$ is the d-axis current compensation signal of the grid-connected inverter; $k_{dVSS}$ and $k_{qVSS}$ are the gain control parameters of the d-axis and q-axis current compensation signals respectively; $T_{dVSS}$ and $T_{qVSS}$ are low-pass filter time constants for the d-axis and q-axis current compensation signals respectively.

More preferably, the expressions of the d-axis current compensation signal of the grid-connected inverter and the q-axis current compensation signal of the grid-connected inverter respectively compensating the d-axis current and q-axis current actually output by the grid-connected inverter are as follows:

$$\begin{cases} I_d^{VSC} = \dfrac{k_{pdc}s + k_{idc}}{s}(U_{dc} - U_{dc}^*) - I_{td}^{add} \\ I_q^{VSC} = \dfrac{k_{pac}s + k_{iac}}{s}(U_t - U_t^*) + I_{tq}^{add} \end{cases}$$

In the expression, $I_d^{VSC}$ and $I_q^{VSC}$ respectively the d-axis current control signal and q-axis current control signal of the grid-connected inverter; $k_{pdc}$, $k_{idc}$, $k_{pac}$ and $k_{iac}$ are the control parameters of the grid-connected inverter; $U_{dc}^*$ and $U_{dc}$ are respectively the control reference value and actual value of the DC voltage; $U_t^*$ and $U_t$ are the control reference value and actual value of the AC terminal voltage respectively.

In the second aspect, the present disclosure provides a vector synchronization system for improving the small interference stability of a grid-connected inverter, including: a coordinate conversion module, an adder, a first gain module, a first integration module, a second gain module, a second integration module, a proportional integration controller, a first low-pass filter and the second low-pass filter.

The input terminal of the coordinate conversion module is connected to the output terminal of the proportional integration controller, and the output terminal of the coordinate conversion module is connected to the first input terminal of the adder and the first input terminal of the second gain module; the second input terminal of the adder is connected to the output terminal of the first integration module; the first output terminal of the adder is connected to the input terminal of the first gain module, and the second output terminal of the adder is connected to the first low-pass filter; the output terminal of the first gain module is connected to the input terminal of the first integration module; the output terminal of the second gain module is connected to the input terminal of the second integration module; the output terminal of the second integration module is connected to the input terminal of the proportional integration controller; and the third output terminal of the coordinate conversion module is connected to the second low-pass filter.

The coordinate conversion module is used to convert the three-phase instantaneous value of the power grid voltage into a d-axis voltage vector component and a q-axis voltage vector component through the power grid voltage vector phase angle at the previous moment; wherein the q-axis voltage vector component serves as the q-axis voltage component deviation.

The adder is used to subtract the d-axis voltage vector component from the power grid vector amplitude at the previous moment to obtain the d-axis voltage component deviation.

The first gain module and first integration module are used to perform gain and integral operations on the d-axis voltage component deviation in sequence to obtain the power grid vector amplitude at the current moment.

The first low-pass filter is used to convert the d-axis voltage component deviation into the q-axis current compensation signal of the grid-connected inverter.

The second gain module, second integration module and proportional integration controller are used to perform gain, integral and proportional-integral operations on the q-axis voltage component deviation in sequence to obtain the power grid voltage vector phase angle at the current moment.

The second low-pass filter is used to convert the q-axis voltage component deviation into the d-axis current compensation signal of the grid-connected inverter.

Specifically, the d-axis current compensation signal of the grid-connected inverter and the q-axis current compensation signal of the grid-connected inverter are respectively used to compensate the d-axis current and q-axis current actually output by the grid-connected inverter, so as to enhance the small interference stability of the grid-connected inverter.

More preferably, the expressions of the d-axis voltage component deviation and q-axis voltage component deviation are as follows:

$$\begin{cases} U_{tq\_err}^{VSS} = U_{tq}^{VSS} \\ U_{td\_err}^{VSS} = U_{td}^{VSS} - U_{VSS} \end{cases}$$

In the expression, $U_{td\_err}^{VSS}$ is the d-axis voltage component deviation; $U_{tq\_err}^{VSS}$ is the q-axis voltage component deviation; $U_{td}^{VSS}$ is the d-axis voltage vector component; $U_{tq}^{VSS}$ is the q-axis voltage vector component; $U_{VSS}$ is the power grid vector amplitude at the previous moment.

More preferably, the q-axis current compensation signal of the grid-connected inverter and the d-axis current compensation signal of the grid-connected inverter are expressed as follows:

$$\begin{cases} I_{td}^{add} = U_{tq}^{VSS} \dfrac{k_{qVSS}}{T_{qVSS}s + 1} = U_{tq\_err}^{VSS} K_{qVSS}(s) \\ I_{tq}^{add} = (U_{td}^{VSS} - U_{VSS}) \dfrac{k_{dVSS}}{T_{dVSS}s + 1} = U_{td\_err}^{VSS} K_{dVSS}(s) \end{cases}$$

In the expression, $I_{tq}^{add}$ is the q-axis current compensation signal of the grid-connected inverter; $I_{td}^{add}$ is the d-axis current compensation signal of the grid-connected inverter; $k_{dVSS}$ and $k_{qVSS}$ are the gain control parameters of the d-axis and q-axis current compensation signals respectively; $T_{dVSS}$ and $T_{qVSS}$ are the low-pass filter time constants of d-axis and q-axis current compensation signals respectively.

Moreover preferably, the expressions of the d-axis current compensation signal of the grid-connected inverter and the q-axis current compensation signal of the grid-connected inverter respectively compensating the d-axis current and q-axis current actually output by the grid-connected inverter are as follows:

$$\begin{cases} I_d^{VSC} = \dfrac{k_{pdc}s + k_{idc}}{s}(U_{dc} - U_{dc}^*) - I_{td}^{add} \\ I_q^{VSC} = \dfrac{k_{pac}s + k_{iac}}{s}(U_t - U_t^*) + I_{tq}^{add} \end{cases}$$

In the expression, $I_d^{VSC}$ and $I_q^{VSC}$ are respectively the d-axis current control signal and q-axis current control signal of the grid-connected inverter; $k_{pdc}$, $k_{idc}$, $k_{pac}$ and $k_{iac}$ are the control parameters of the grid-connected inverter; $U_{dc}^*$ and $U_{dc}$ are respectively the control reference value and actual value of the DC voltage; $U_t^*$ and $U_t$ are the control reference value and actual value of the AC terminal voltage respectively.

In the third aspect, the present application provides an electronic device, including: at least one memory for storing a program; at least one processor for executing the program stored in the memory. When the program stored in the memory is executed, the processor is configured to execute a method described in the first aspect or any possible implementation of the first aspect.

In the fourth aspect, the present application provides a computer-readable storage medium. The computer-readable storage medium stores a computer program. When the computer program is run on a processor, the processor is enabled to execute the method described in the first aspect or any possible implementation of the first aspect.

In the fifth aspect, the present disclosure provides a computer program product. When the computer program product is run on a processor, the processor is enabled to execute the method described in the first aspect or any possible implementation of the first aspect.

It can be understood that the advantageous effects mentioned in the second aspect to the fifth aspect may be derived from the relevant description in the first aspect, and will not be described again here.

Generally speaking, compared with the related art, the above technical solution conceived by the present disclosure has the following advantageous effects:

The principle of the vector synchronization method and system provided by the present disclosure is that after the power grid voltage vector is subjected to coordinate conversion, when the small interference of the grid-connected inverter is stable, the difference between the d-axis voltage vector component and the power grid vector amplitude $U_{VSS}$ is 0, the q-axis voltage vector component is 0; when the small interference of the grid-connected inverter is unstable, there is a deviation between the d-axis voltage vector component and the power grid vector amplitude $U_{VSS}$, and the q-axis voltage vector component is not 0. Therefore, the present disclosure converts the d-axis voltage component deviation and q-axis voltage component deviation into corresponding current compensation signals. The current compensation signal is used to compensate the d-axis current and q-axis current actually output by the grid-connected inverter, thereby suppressing small interference instability of the grid-connected inverter. Compared with the existing small interference stability enhancement methods for grid-connected inverters such as power system stabilizers, grid-type control strategy modifications, and synchronous condensers, the present disclosure makes it possible to realize small interference instability suppression without adding additional equipment and making large-scale modification to mature commercial grid-connected inverters. Moreover, the implementation of current feedforward signal injection makes the present disclosure have good adaptability in various types of power electronic devices for energy storage, photovoltaics, and wind power generation and so on.

DESCRIPTION OF THE EMBODIMENTS

Figure 1:
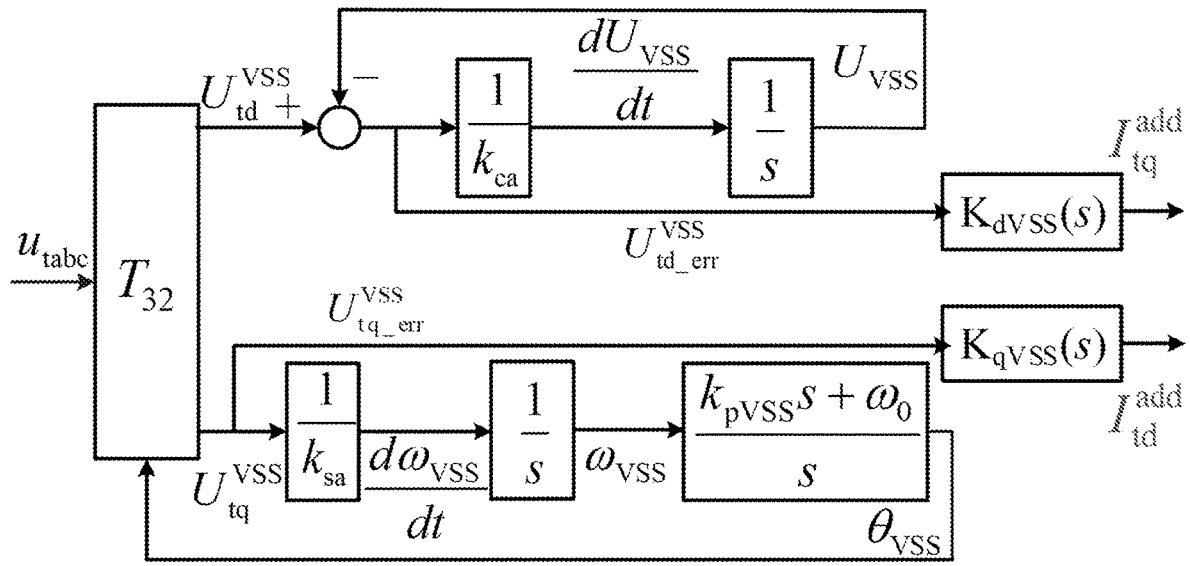
FIG. 1 is a schematic diagram of a vector synchronization system provided by an embodiment of the present disclosure.

In order to make the purpose, technical solutions and advantages of the present disclosure more clear, the present disclosure will be further described in detail below with reference to the accompanying drawings and embodiments. It should be understood that the specific embodiments described here are only used to explain the present disclosure and are not intended to limit the present disclosure.

The term "and/or" used in the present disclosure is used to describe an association relationship of related objects, indicating that there may be three relationships. For example, A and/or B can mean three situations: A exists alone, A and B exist simultaneously, or B exists alone. The symbol "/" used in the present disclosure indicates that there is an "or" relationship between related objects, for example, A/B means A or B.

The terms "first", "second", and so on in the description and claims herein are used to distinguish different objects, rather than to describe a specific order of objects. For example, the first response and the second response are used to distinguish different responses, but are not used to describe a specific sequence of response.

In the embodiments of the present disclosure, words such as "exemplary" or "for example" are used to represent examples, illustrations or explanations. Any embodiment or design described as "exemplary" or "such as" in the embodiments of the present application should not to be construed as preferred or advantageous over other embodiments or designs. Rather, the words "exemplary" or "such as" are used with the intention to present the concept in a concrete manner.

In the description of the embodiments of the disclosure, unless otherwise stated, the meaning of "plurality of" refers to two or more, for example, a plurality of processing units refers to two or more processing units, etc.; a plurality of component refers to two or more components, etc.

This embodiment provides a vector synchronization method and system for improving the small interference stability of grid-connected inverters, which may be used to improve the small interference stability of new energy grid-connected inverters, and avoid multiple types of small interference instability problems such as harmonic resonance of distribution network/microgrid, oscillation of weak grid with new energy access, thereby improving the operation stability of new energy transmission and distribution systems. This embodiment achieves the small interference stability enhancement function by implementing three steps: dynamic detection of power grid vector, generating current feedforward compensation signal, and injecting current feedforward compensation signal into current control loop of grid-connected inverter. In dynamic detection of power grid vector, the power grid vector dynamic information from a certain perspective is detected through the vector synchronization structure inside the vector synchronization system, and the power grid vector dynamic information serves as the basis for the generation of stable enhanced control signal; in current feedforward compensation signal generation algorithm, the current compensation signal of the grid-connected inverter for suppressing small interference instability is dynamically generated based on the power grid vector; the current feedforward compensation signal is injected into the current control loop of the grid-connected inverter to achieve a stable enhancement effect. Compared with existing power system stabilizers, by using grid-type control strategy transformation, synchronous condensers and other small interference stability enhancement methods for grid-connected inverters, the present disclosure makes it possible to realize small interference instability suppression without adding additional equipment and making large-scale modification to mature commercial grid-connected inverters.

Moreover, the implementation of current feedforward signal injection makes the present disclosure have good adaptability in various types of power electronic devices for energy storage, photovoltaics, and wind power generation and so on.

Next, the technical solutions provided in the embodiments of the disclosure will be introduced in detail.

The principle of the vector synchronization method and system provided by the present disclosure is that after the power grid voltage vector is subjected to coordinate conversion, when the small interference of the grid-connected inverter is stable, the difference between the d-axis voltage vector component and the power grid vector amplitude $U_{VSS}$ is 0, the q-axis voltage vector component is 0; when the small interference of the grid-connected inverter is unstable, there is a deviation between the d-axis voltage vector component and the power grid vector amplitude $U_{VSS}$, and the q-axis voltage vector component is not 0. Therefore, the present disclosure converts the d-axis voltage component deviation $U_{td\_err}^{VSS}$ and q-axis voltage component deviation $U_{tq\_err}^{VSS}$ into corresponding current compensation signals. The current compensation signal is used to compensate the d-axis current and q-axis current actually output by the grid-connected inverter, thereby suppressing small interference instability of the grid-connected inverter.

In the first aspect, embodiments of the present disclosure provide a vector synchronization system for improving the small interference stability of a grid-connected inverter, including: a coordinate conversion module, an adder, a first gain module, a first integration module, a second gain module, a second integration module, a proportional integration controller, a first low-pass filter and a second low-pass filter.

The first input terminal of the adder and the first input terminal of the second gain module are connected to the output terminal of the coordinate conversion module; the second input terminal of the adder is connected to the output terminal of the first integration module; the first output terminal of the adder is connected to the first gain module, and the second input terminal of the adder is connected to the output terminal of the first integration module. The second output terminal is connected to the first low-pass filter; the output terminal of the first gain module is connected to the input terminal of the first integration module; the output terminal of the second gain module is connected to the input terminal of the second integration module; the output terminal of the second integration module is connected to the input terminal of the proportional integration controller; the output terminal of the proportional integration controller is connected to the input terminal of the coordinate conversion module; the third output terminal of the coordinate conversion module is connected to the second low-pass filter.

The coordinate conversion module is used to convert the three-phase instantaneous value $u_{tabc}$ of the power grid voltage into two-phase components $U_{td}^{VSS}$ and $U_{tq}^{VSS}$ by using the power grid voltage vector phase angle at the previous moment; wherein $U_{td}^{VSS}$ is the d-axis voltage vector component; $U_{tq}^{VSS}$ is the q-axis voltage vector component, and which serves as q-axis voltage component deviation $U_{tq\_err}^{VSS}$.

A more specific expression is:

$$\begin{cases} U_{td}^{VSS} = \frac{2}{3}\left[\cos(\theta_{VSS})u_a + \cos\left(\theta_{VSS} - \frac{2}{3}\pi\right)u_b + \cos\left(\theta_{VSS} + \frac{2}{3}\pi\right)u_c\right] \\ U_{tq}^{VSS} = -\frac{2}{3}\left[\sin(\theta_{VSS})u_a + \sin\left(\theta_{VSS} - \frac{2}{3}\pi\right)u_b + \sin\left(\theta_{VSS} + \frac{2}{3}\pi\right)u_c\right] \end{cases}$$

In the expression, $\theta_{VSS}$ is the power grid voltage vector phase angle, $u_a$, $u_b$, and $u_c$ are the three-phase power grid voltage phase a, phase b and phase c respectively.

The adder is used to subtract the d-axis voltage vector component $U_{td}^{VSS}$ from the power grid vector amplitude $U_{VSS}$ at the previous moment to obtain the d-axis voltage component deviation $U_{td\_err}^{VSS}$.

The expressions of the d-axis voltage component deviation $U_{td\_err}^{VSS}$ and q-axis voltage component deviation $U_{tq\_err}^{VSS}$ are as follows:

$$\begin{cases} U_{tq\_err}^{VSS} = U_{tq}^{VSS} \\ U_{td\_err}^{VSS} = U_{td}^{VSS} - U_{VSS} \end{cases}$$

The first gain module and the first integration module are used to perform gain and integral operations on the d-axis voltage component deviation $U_{td\_err}^{VSS}$ in sequence to obtain the power grid vector amplitude $U_{VSS}$ at the current moment.

The second gain module, the second integration module and the proportional integration controller are used to perform gain, integral and proportional-integral operations on the q-axis voltage component deviation $U_{tq}^{VSS}$ in sequence to obtain the power grid voltage vector phase angle $\theta_{VSS}$ at the current moment.

The expressions of the power grid vector amplitude $U_{VSS}$ and the power grid voltage vector phase angle $\theta_{VSS}$ at the current moment are as follows:

$$\begin{cases} \theta_{VSS} = \frac{k_{pVSS}s + \omega_0}{k_{sa}s^2} U_{tq}^{VSS} \\ U_{VSS} = \frac{1}{k_{ca}s}(U_{td}^{VSS} - U_{VSS}) \end{cases}$$

In the expression, $k_{pVSS}$, $\omega 0$, $k_{sa}$ and $k_{ca}$ are the control parameters of the vector synchronous system; $\omega_0$ is the rated frequency of the power grid, which is normally taken as 50 Hz; s is the Laplacian operator; $U_{td}^{VSS}$ is the d-axis voltage vector component; $U_{tq}^{VSS}$ is the q-axis voltage vector component.

The first low-pass filter is used to convert the d-axis voltage component deviation $U_{td\_err}^{VSS}$ into the q-axis current compensation signal $I_{tq}^{add}$ of the grid-connected inverter.

The second low-pass filter is used to convert the q-axis voltage component deviation $U_{tq}^{VSS}$ into the d-axis current compensation signal $I_{td}^{add}$ of the grid-connected inverter.

The d-axis current compensation signal of the grid-connected inverter and the q-axis current compensation signal of the grid-connected inverter are respectively used to compensate the d-axis current and q-axis current actually output by the grid-connected inverter, so as to enhance the small interference stability of the grid-connected inverter.

The expressions of the q-axis current compensation signal $I_{tq}^{add}$ of the grid-connected inverter and the d-axis current compensation signal $I_{td}^{add}$ of the grid-connected inverter are as follows:

$$\begin{cases} I_{td}^{add} = U_{tq}^{VSS} \frac{k_{qVSS}}{T_{qVSS}s + 1} = U_{tq\_err}^{VSS} K_{qVSS}(s) \\ I_{tq}^{add} = (U_{td}^{VSS} - U_{VSS}) \frac{k_{dVSS}}{T_{dVSS}s + 1} = U_{td\_err}^{VSS} K_{dVSS}(s) \end{cases}$$

In the expression, $k_{dVSS}$, $k_{qVSS}$, $T_{dVSS}$ and $T_{qVSS}$ are all vector synchronization system control parameters.

More specifically, the expressions of the d-axis current compensation signal of the grid-connected inverter and the q-axis current compensation signal of the grid-connected inverter respectively compensate the d-axis current and q-axis current actually output by the grid-connected inverter are as follows:

$$\begin{cases} I_d^{VSC} = \frac{k_{pdc}s + k_{idc}}{s}(U_{dc} - U_{dc}^*) - I_{td}^{add} \\ I_q^{VSC} = \frac{k_{pac}s + k_{iac}}{s}(U_t - U_t^*) + I_{tq}^{add} \end{cases}$$

In the expression, $I_d^{VSC}$ and $I_q^{VSC}$ are the current control signals of the grid-connected inverter, $k_{pdc}$, $k_{idc}$, $k_{pac}$ and $k_{iac}$ are all control parameters of the grid-connected inverter; $U_{dc}^*$ and $U_{dc}$ are respectively the control reference value and actual value of the DC voltage; $U_t^*$ and $U_t$ are respectively the control reference value and the actual value of the AC terminal voltage.

In the second aspect, the embodiment provides a vector synchronization method for improving the small interference stability of a grid-connected inverter, which includes the following steps:

Step 1: Dynamic detection of power grid vectors, which specifically includes the following steps:

Step 1.1: The three-phase instantaneous value $u_{tabc}$ of the power grid voltage is converted into two-phase components $U_{td}^{VSS}$ and $U_{tq}^{VSS}$ of the voltage vector in the vector synchronous system coordinate system, wherein $U_{td}^{VSS}$ is the d-axis voltage vector component; $U_{tq}^{VSS}$ is the q-axis voltage vector component, and which serves as the q-axis voltage component deviation $U_{td\_err}^{VSS}$; the expression is as follows:

$$\begin{cases} U_{td}^{VSS} = \frac{2}{3}\left[\cos(\theta_{VSS})u_a + \cos\left(\theta_{VSS} - \frac{2}{3}\pi\right)u_b + \cos\left(\theta_{VSS} + \frac{2}{3}\pi\right)u_c\right] \\ U_{tq}^{VSS} = -\frac{2}{3}\left[\sin(\theta_{VSS})u_a + \sin\left(\theta_{VSS} - \frac{2}{3}\pi\right)u_b + \sin\left(\theta_{VSS} + \frac{2}{3}\pi\right)u_c\right] \end{cases}$$

In the expression, $\theta_{VSS}$ is the power grid voltage vector phase angle, $u_a$, $u_b$ and $u_c$ are the three-phase grid voltage phase a, phase b and phase c respectively.

Step 1.2: The d-axis voltage vector component $U_{td}^{VSS}$ is subtracted from the power grid vector amplitude $U_{VSS}$ at the previous moment to obtain the d-axis voltage component deviation $U_{td\_err}^{VSS}$; wherein the expressions of d-axis voltage component deviation $U_{td\_err}^{VSS}$ and q-axis voltage component deviation $U_{tq\_err}^{VSS}$ are as follows:

$$\begin{cases} U_{tq\_err}^{VSS} = U_{tq}^{VSS} \\ U_{td\_err}^{VSS} = U_{td}^{VSS} - U_{VSS} \end{cases}$$

Step 1.3: The gain and integral operations are performed on the d-axis voltage component deviation $U_{td\_err}^{VSS}$ in sequence to obtain the power grid vector amplitude $U_{VSS}$ at the current moment.

Step 1.4: The gain, integral and proportional-integral operations are performed on the q-axis voltage component deviation $U_{tq}^{VSS}$ in sequence to obtain the power grid voltage vector phase angle $\theta_{VSS}$ at the current moment.

The expressions of the power grid vector amplitude $U_{VSS}$ and the power grid voltage vector phase angle $\theta_{VSS}$ at the current moment are as follows:

$$\begin{cases} \theta_{VSS} = \frac{k_{pVSS}s + \omega_0}{k_{sa}s^2}U_{tq}^{VSS} \\ U_{VSS} = \frac{1}{k_{ca}s}(U_{td}^{VSS} - U_{VSS}) \end{cases}$$

Step 2: Current feedforward compensation signal generation; more specifically, current feedforward compensation signal generation includes the following steps:

Step 2.1: The d-axis voltage component deviation $U_{td\_err}^{VSS}$ is performed into the q-axis current compensation signal $I_{tq}^{add}$ of the grid-connected inverter.

Step 2.2: The q-axis voltage component deviation $U_{tq}^{VSS}$ is converted into the d-axis current compensation signal $I_{td}^{add}$ of the grid-connected inverter.

The specific current feedforward compensation signal generation algorithm is as follows:

$$\begin{cases} I_{td}^{add} = U_{tq}^{VSS}\frac{k_{qVSS}}{T_{qVSS}s + 1} = U_{tq\_err}^{VSS}K_{qVSS}(s) \\ I_{tq}^{add} = (U_{td}^{VSS} - U_{VSS})\frac{k_{dVSS}}{T_{dVSS}s + 1} = U_{td\_err}^{VSS}K_{dVSS}(s) \end{cases}$$

In the expression, $k_{dVSS}$, $k_{qVSS}$, $T_{dVSS}$ and $T_{qVSS}$ are all vector synchronous stabilizer control parameters.

Step 3: The current feedforward compensation signal is injected into the current control loop of the grid-connected inverter; more specifically, the d-axis current compensation signal of the grid-connected inverter and the q-axis current compensation signal of the grid-connected inverter are used to respectively compensate the d-axis current and the q-axis current actually output by the grid-connected inverter, so as to enhance the small interference stability of the grid-connected inverter.

The specific algorithm is:

$$\begin{cases} I_d^{VSC} = \frac{k_{pdc}s + k_{idc}}{s}(U_{dc} - U_{dc}^*) - I_{td}^{add} \\ I_q^{VSC} = \frac{k_{pac}s + k_{iac}}{s}(U_t - U_t^*) + I_{tq}^{add} \end{cases}$$

In the expression, $I_d^{VSC}$ and $I_q^{VSC}$ are the current control signals of the grid-connected inverter, and $k_{pdc}$, $k_{idc}$, $k_{pac}$, $k_{iac}$, $U_{dc}^*$, $U_{dc}$, $U_t^*$, and $U_t$ are all control parameters of the grid-connected inverter.

EXAMPLE

Figure 2:
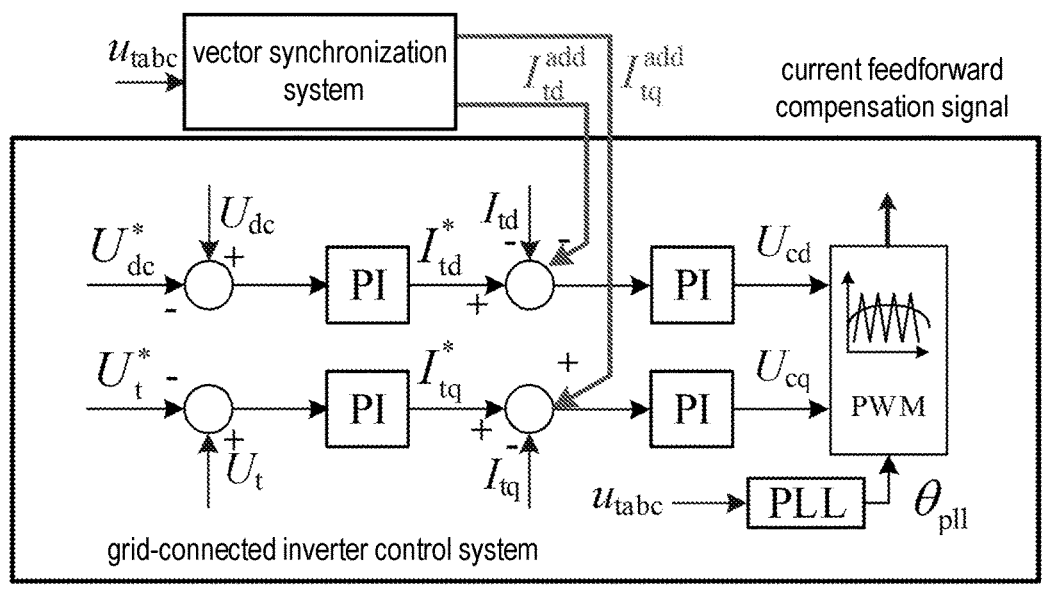
FIG. 2 is a control block diagram of a grid-connected converter provided by an embodiment of the present disclosure.

As shown in FIG. 2, the embodiment of the present disclosure provides a block diagram of grid-connected converter control, which does not use the grid-connected inverter control system of the present disclosure. The difference between $U_{dc}^*$ and $U_{dc}$ and the difference between $U_t^*$ and $U_t$ are respectively used to generate the d-axis and q-axis current commands $I_{td}^*$ and $I_{tq}^*$ through a proportional-integral PI control loop. The d-axis and q-axis current commands $I_{td}^*$ and $I_{tq}^*$ are respectively subtracted from the d-axis and q-axis actual currents $I_{td}$ and $I_{tq}$, and the difference between them is used to generate the voltage modulation signal of the grid-connected inverter through the proportional-integral PI control loop. By using the present disclosure, the vector synchronous stabilization system will generate the d-axis current compensation signal $I_{td}^{add}$ and the q-axis current compensation signal $I_{tq}^{add}$, and the adder before the PI control loop that generates the voltage modulation signal of the grid-connected inverter is added to achieve the instability suppression function.

Figure 3A:
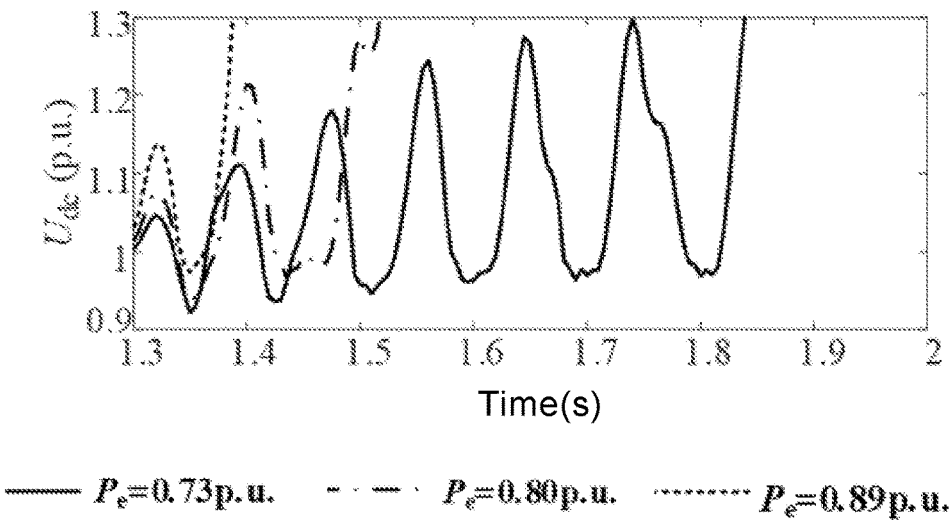
FIG. 3A is a DC voltage curve diagram of the converter which does not adopt the vector synchronization system provided by an embodiment of the present disclosure.
Figure 3B:
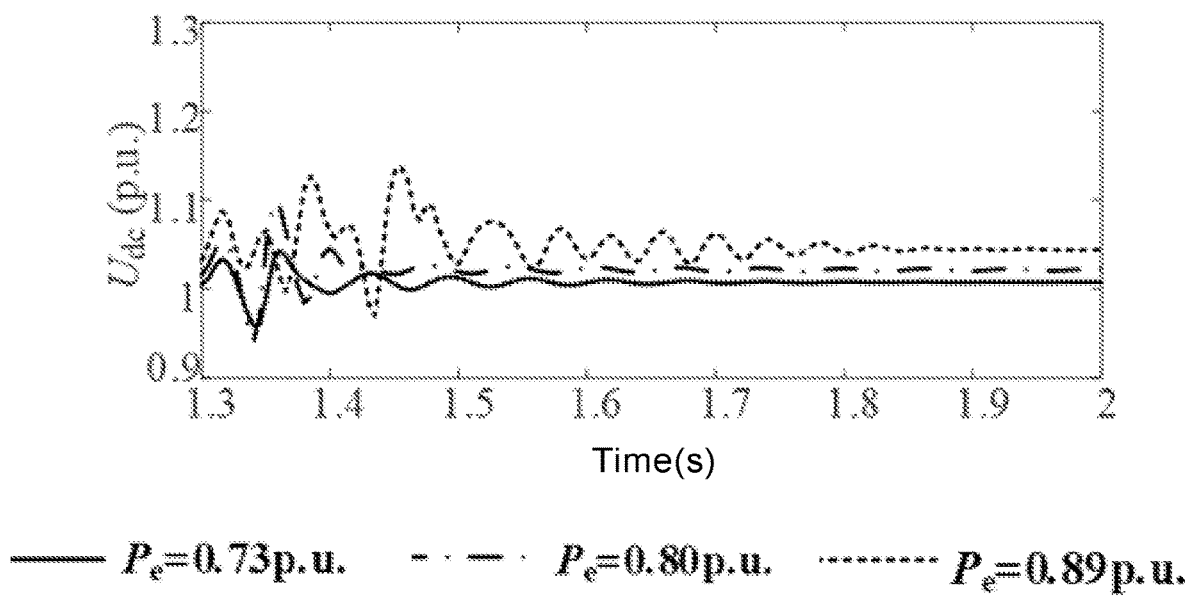
FIG. 3B is a DC voltage curve diagram of the converter which adopts the vector synchronization system provided by an embodiment of the present disclosure.

FIG. 3A shows the curve diagram of DC voltage $U_{dc}$ of the inverter without using the vector synchronization system of the present disclosure. It can be seen from the figure that as the output power $P_e$ of the grid-connected inverter increases from 0.73p.u. to 0.80p.u. and then to 0.89p.u., the DC voltage oscillation of the grid-connected inverter exceeds the upper limit value of 1.30p.u. at 1.83 s, 1.52 s, and 1.38 s respectively, which leads to oscillation instability and collapse of the grid-connected inverter system. FIG. 3B is a DC voltage curve diagram of the converter which adopts the vector synchronization system of the present disclosure. It can be seen from the figure that as the output power $P_e$ of the grid-connected inverter increases from 0.73p.u. to 0.80p.u. and then to 0.89p.u., the oscillation process of the DC voltage is quickly suppressed, and the oscillation amplitude of the DV voltage does not exceed 1.20p.u., and the grid inverter system operates safely and stably. It can be seen from the comparison that the use of the present disclosure may effectively suppress the oscillation of the grid-connected inverter and improve the operation stability.

To sum up, compared with the related art, the present disclosure has the following advantages:

The principle of the vector synchronization method and system provided by the present disclosure is that after the power grid voltage vector is subjected to coordinate conversion, when the small interference of the grid-connected inverter is stable, the difference between the d-axis voltage vector component and the power grid vector amplitude $U_{VSS}$ is 0, the q-axis voltage vector component is 0; when the small interference of the grid-connected inverter is unstable, there is a deviation between the d-axis voltage vector component and the power grid vector amplitude $U_{VSS}$, and the q-axis voltage vector component is not 0. Therefore, the present disclosure converts the d-axis voltage component deviation and q-axis voltage component deviation into corresponding current compensation signals. The current compensation signal is used to compensate the d-axis current and q-axis current actually output by the grid-connected inverter, thereby suppressing small interference instability of the grid-connected inverter. Compared with the existing small interference stability enhancement methods for grid-connected inverters such as power system stabilizers, grid-type control strategy modifications, and synchronous condensers, the present disclosure makes it possible to realize small interference instability suppression without adding additional equipment and making large-scale modification to mature commercial grid-connected inverters. Moreover, the implementation of current feedforward signal injection makes the present disclosure have good adaptability in various types of power electronic devices for energy storage, photovoltaics, and wind power generation and so on.

It should be understood that the above device is used to execute the method in the above embodiment. The corresponding program module in the device has implementation principles and technical effects similar to those described in the above method. For the operation process of the device, please refer to the corresponding program module in the above method. The related details will not be described again here.

Based on the methods in the above embodiments, embodiments of the present disclosure provide an electronic device. The device may include: at least one memory for storing a program and at least one processor for executing the program stored in the memory, wherein when the program stored in the memory is executed, the processor is used to execute the method described in the above embodiment.

Based on the methods in the above embodiments, embodiments of the present disclosure provide a computer-readable storage medium. The computer-readable storage medium stores a computer program. When the computer program is run on a processor, the processor is enabled to execute the method described in the above embodiment.

Based on the methods in the above embodiments, embodiments of the present disclosure provide a computer program product, wherein when the computer program product is run on a processor, the processor is enabled to execute the method described in the above embodiment.

It can be understood that the processor in the embodiments of the present disclosure may be a central processing unit (CPU), or other general-purpose processors, a digital signal processor (DSP), an application specific integrated circuit (ASIC), a field programmable gate array (FPGA) or other programmable logic devices, a transistor logic device, a hardware component or any combination thereof. A general-purpose processor may be a microprocessor or any conventional processor.

The steps in the embodiments of the present disclosure may be implemented by hardware or by a processor executing software instructions. Software instructions may be composed of corresponding software modules. The software modules may be stored in random access memory (RAM), flash memory, read-only memory (ROM), programmable rom (PROM), erasable PROM (EPROM), electrically EPROM (EEPROM), register, hard disk, mobile hard disk, CD-ROM or other commonly known storage media in any other form. An exemplary storage medium is coupled to the processor such that the processor may read information from the storage medium and write information to the storage medium. Of course, the storage medium may also be an integral part of the processor. The processor and storage media may be located in an ASIC.

The above embodiments may be implemented in whole or in part by software, hardware, firmware, or any combination thereof. When the embodiments are implemented by using software, they may be implemented in whole or in part in the form of a computer program product. The computer program product includes one or more computer instructions. When the computer program instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in or transmitted over a computer-readable storage medium. The computer instructions may be transmitted from one website, computer, server or data center to another website, computer, server or data center through wired (such as coaxial cable, optical fiber, digital subscriber line (DSL)) or wireless (such as infrared, wireless, microwave, etc.) means. The computer-readable storage medium may be any available medium that can be accessed by a computer or a data storage device such as a server, data center, etc. that contains one or more available integrated media. The available media may be magnetic media (e.g., floppy disk, hard disk, magnetic tape), optical media (e.g., DVD), or semiconductor media (e.g., solid state disk (SSD)), etc.

It can be understood that the various numerical numbers involved in the embodiments of the present disclosure are only for convenience of description and are not used to limit the scope of the embodiments of the present disclosure.

It is easy for those skilled in the art to understand that the above descriptions are only preferred embodiments of the present disclosure and are not intended to limit the present disclosure. Any modifications, equivalent substitutions and improvements, etc., made within the spirit and principles of the present disclosure should all be included in the scope to be protected by the present disclosure.

What is claimed is:

1. A vector synchronization method for improving small interference stability of a grid-connected inverter, comprising:
    converting a three-phase instantaneous value of a power grid voltage into a d-axis voltage vector component and a q-axis voltage vector component through employing a power grid voltage vector phase angle at a previous moment; wherein the q-axis voltage vector component serves as a q-axis voltage component deviation;
    subtracting the d-axis voltage vector component from a power grid vector amplitude at the previous moment to obtain a d-axis voltage component deviation;
    performing gain and integral operations on the d-axis voltage component deviation in sequence to obtain a power grid vector amplitude at a current moment; wherein the power grid vector amplitude at the current moment is used to calculate a d-axis voltage component deviation at a next moment;
    performing the gain and integral operations and a proportional-integral operation on the q-axis voltage component deviation in sequence to obtain a power grid voltage vector phase angle at the current moment; wherein the power grid voltage vector phase angle at the current moment is used for converting a coordinate of a three-phase instantaneous value of a power grid voltage at the next moment;
    converting the d-axis voltage component deviation into a q-axis current compensation signal of the grid-connected inverter;
    converting the q-axis voltage component deviation into a d-axis current compensation signal of the grid-connected inverter;
    enhancing the small-interference stability of the grid-connected inverter by adopting the d-axis current compensation signal of the grid-connected inverter and the q-axis current compensation signal of the grid-connected inverter to respectively compensate a d-axis current and a q-axis current actually output by the grid-connected inverter.

2. The vector synchronization method according to claim 1, wherein expressions of the d-axis voltage component deviation and the q-axis voltage component deviation are as follows:

$$\begin{cases} U_{tq\_err}^{VSS} = U_{tq}^{VSS} \\ U_{td\_err}^{VSS} = U_{td}^{VSS} - U_{VSS} \end{cases}$$

wherein $U_{td\_err}^{VSS}$ is the d-axis voltage component deviation; $U_{tq\_err}^{VSS}$ is the q-axis voltage component deviation; $U_{td}^{VSS}$ is the d-axis voltage vector component; $U_{tq\_err}^{VSS}$ is the q-axis voltage vector component; $U_{VSS}$ is the power grid vector amplitude at the previous moment.

3. The vector synchronization method according to claim 2, wherein the q-axis current compensation signal of the grid-connected inverter and the d-axis current compensation signal of the grid-connected inverter are expressed as follows:

$$\begin{cases} I_{td}^{add} = U_{tq}^{VSS} \frac{k_{qVSS}}{T_{qVSS}s+1} = U_{tq\_err}^{VSS} K_{qVSS}(s) \\ I_{tq}^{add} = (U_{td}^{VSS} - U_{VSS}) \frac{k_{dVSS}}{T_{dVSS}s+1} = U_{td\_err}^{VSS} K_{dVSS}(s) \end{cases}$$

wherein $I_{tq}^{add}$ is the q-axis current compensation signal of the grid-connected inverter; $I_{td}^{add}$ is the d-axis current compensation signal of the grid-connected inverter; $k_{dVSS}$ and $k_{qVSS}$ are gain control parameters of the d-axis current compensation signal and the q-axis current compensation signal respectively; $T_{dVSS}$ and $T_{qVSS}$ are low-pass filter time constants for the d-axis current compensation signal and the q-axis current compensation signal respectively.

4. The vector synchronization method according to claim 3, wherein expressions of the d-axis current compensation signal of the grid-connected inverter and the q-axis current compensation signal of the grid-connected inverter respectively compensating the d-axis current and the q-axis current actually output by the grid-connected inverter are as follows:

$$\begin{cases} I_d^{VSC} = \frac{k_{pdc}s + k_{idc}}{s}(U_{dc} - U_{dc}^*) - I_{td}^{add} \\ I_q^{VSC} = \frac{k_{pac}s + k_{iac}}{s}(U_t - U_t^*) + I_{tq}^{add} \end{cases}$$

wherein $I_d^{VSC}$ and $I_q^{VSC}$ are respectively a d-axis current control signal and a q-axis current control signal of the grid-connected inverter; $k_{pdc}$, $k_{idc}$, $k_{pac}$ and $k_{iac}$ are control parameters of the grid-connected inverter; $U_{dc}^*$ and $U_{dc}$ are respectively a control reference value and an actual value of a DC voltage; $U_t^*$ and $U_t$ are a control reference value and an actual value of an AC terminal voltage respectively.

5. A vector synchronization system for improving small interference stability of a grid-connected inverter, comprising: a coordinate conversion module, an adder, a first gain module, a first integration module, a second gain module, a second integration module, a proportional integration controller, a first low-pass filter and a second low-pass filter;
    an input terminal of the coordinate conversion module is connected to an output terminal of the proportional integration controller, and an output terminal of the coordinate conversion module is connected to a first input terminal of the adder and a first input terminal of the second gain module; a second input terminal of the adder is connected to an output terminal of the first integration module; a first output terminal of the adder is connected to an input terminal of the first gain module, and a second output terminal of the adder is connected to the first low-pass filter; an output terminal of the first gain module is connected to an input terminal of the first integration module; an output terminal of the second gain module is connected to an input terminal of the second integration module; an output terminal of the second integration module is connected to an input terminal of the proportional integration controller; and a third output terminal of the coordinate conversion module is connected to the second low-pass filter;

the coordinate conversion module is used to convert a three-phase instantaneous value of a power grid voltage into a d-axis voltage vector component and a q-axis voltage vector component through a power grid voltage vector phase angle at a previous moment;

the adder is used to subtract a d-axis voltage vector component from a power grid vector amplitude at the previous moment to obtain a d-axis voltage component deviation; the first gain module and first integration module are used to perform gain and integral operations on the d-axis voltage component deviation in sequence to obtain a power grid vector amplitude at a current moment; wherein the power grid vector amplitude at the current moment is used to calculate a d-axis voltage component deviation at a next moment;

the second gain module, the second integration module and the proportional integration controller are used to perform the gain and integral operations and a proportional-integral operation on a q-axis voltage component deviation in sequence to obtain a power grid voltage vector phase angle at the current moment; wherein the power grid voltage vector phase angle at the current moment is used for a coordinate conversion of a three-phase instantaneous value of a power grid voltage at the next moment; the q-axis voltage vector component serves as the q-axis voltage component deviation;

the first low-pass filter is used to convert the d-axis voltage component deviation into a q-axis current compensation signal of the grid-connected inverter; the second low-pass filter is used to convert the q-axis voltage component deviation into a d-axis current compensation signal of the grid-connected inverter;

wherein the d-axis current compensation signal of the grid-connected inverter and the q-axis current compensation signal of the grid-connected inverter are respectively used to compensate a d-axis current and a q-axis current actually output by the grid-connected inverter, so as to enhance the small interference stability of the grid-connected inverter.

6. The vector synchronization system according to claim 5, wherein expressions of the d-axis voltage component deviation and the q-axis voltage component deviation are as follows:

$$\begin{cases} U_{tq\_err}^{VSS} = U_{tq}^{VSS} \\ U_{td\_err}^{VSS} = U_{td}^{VSS} - U_{VSS} \end{cases}$$

wherein $U_{td\_err}^{VSS}$ is the d-axis voltage component deviation; $U_{tq\_err}^{VSS}$ is the q-axis voltage component deviation; $U_{td}^{VSS}$ is the d-axis voltage vector component; $U_{tq}^{VSS}$ is the q-axis voltage vector component; $U_{VSS}$ is the power grid vector amplitude at the previous moment.

7. The vector synchronization system according to claim 6, wherein the q-axis current compensation signal of the grid-connected inverter and the d-axis current compensation signal of the grid-connected inverter are expressed as follows:

$$\begin{cases} I_{td}^{add} = U_{tq}^{VSS} \frac{k_{qVSS}}{T_{qVSS}s + 1} = U_{tq\_err}^{VSS} K_{qVSS}(s) \\ I_{tq}^{add} = (U_{td}^{VSS} - U_{VSS}) \frac{k_{dVSS}}{T_{dVSS}s + 1} = U_{td\_err}^{VSS} K_{dVSS}(s) \end{cases}$$

wherein $I_{tq}^{add}$ is the q-axis current compensation signal of the grid-connected inverter; $I_{tq}^{add}$ is the d-axis current compensation signal of the grid-connected inverter; $k_{dVSS}$ and $k_{qVSS}$ are gain control parameters of the d-axis current compensation signal and the q-axis current compensation signal respectively; $T_{dVSS}$ and $T_{qVSS}$ are low-pass filter time constants of the d-axis current compensation signal and the q-axis current compensation signal respectively.

8. The vector synchronization system according to claim 7, wherein expressions of the d-axis current compensation signal of the grid-connected inverter and the q-axis current compensation signal of the grid-connected inverter respectively compensating the d-axis current and the q-axis current actually output by the grid-connected inverter are as follows:

$$\begin{cases} I_d^{VSC} = \frac{k_{pdc}s + k_{idc}}{s}(U_{dc} - U_{dc}^*) - I_{td}^{add} \\ I_q^{VSC} = \frac{k_{pac}s + k_{iac}}{s}(U_t - U_t^*) + I_{tq}^{add} \end{cases}$$

wherein $I_d^{VSC}$ and $I_q^{VSC}$ are respectively a d-axis current control signal and a q-axis current control signal of the grid-connected inverter, $k_{pdc}$, $k_{idc}$, $k_{pac}$ and $k_{iac}$ are control parameters of the grid-connected inverter, $U_{dc}^*$ and $U_{dc}$ are respectively a control reference value and an actual value of a DC voltage; $U_t^*$ and $U_t$ are a control reference value and an actual value of an AC terminal voltage respectively.

* * * * *